Jan. 29, 1924.  W. SPARTIVENTO  1,482,273
COFFEE ROASTER
Filed Feb. 18, 1920    2 Sheets-Sheet 2

Inventor
W. Spartivento

Patented Jan. 29, 1924.

1,482,273

UNITED STATES PATENT OFFICE.

WILLIAM SPARTIVENTO, OF BUFFALO, NEW YORK.

COFFEE ROASTER.

Application filed February 18, 1920. Serial No. 359,681.

*To all whom it may concern:*

Be it known that I, WILLIAM SPARTIVENTO, a subject of the King of Italy, residing at Buffalo, in the county of Erie and State of New York, have invented certain new and useful Improvements in Coffee Roasters; and I do hereby declare the following to be a full, clear, and exact description of the invention, such as will enable others skilled in the art to which it appertains to make and use the same.

My invention relates to a device adapted for roasting coffee or the like, while not necessarily restricted to this use.

An important object of the invention is to provide a device of the above mentioned character, having means to attach the same to a stove, to prevent displacement, during the operation of the movable element holding the coffee.

Other objects and advantages of the invention will be apparent during the course of the following description.

Figure 1:
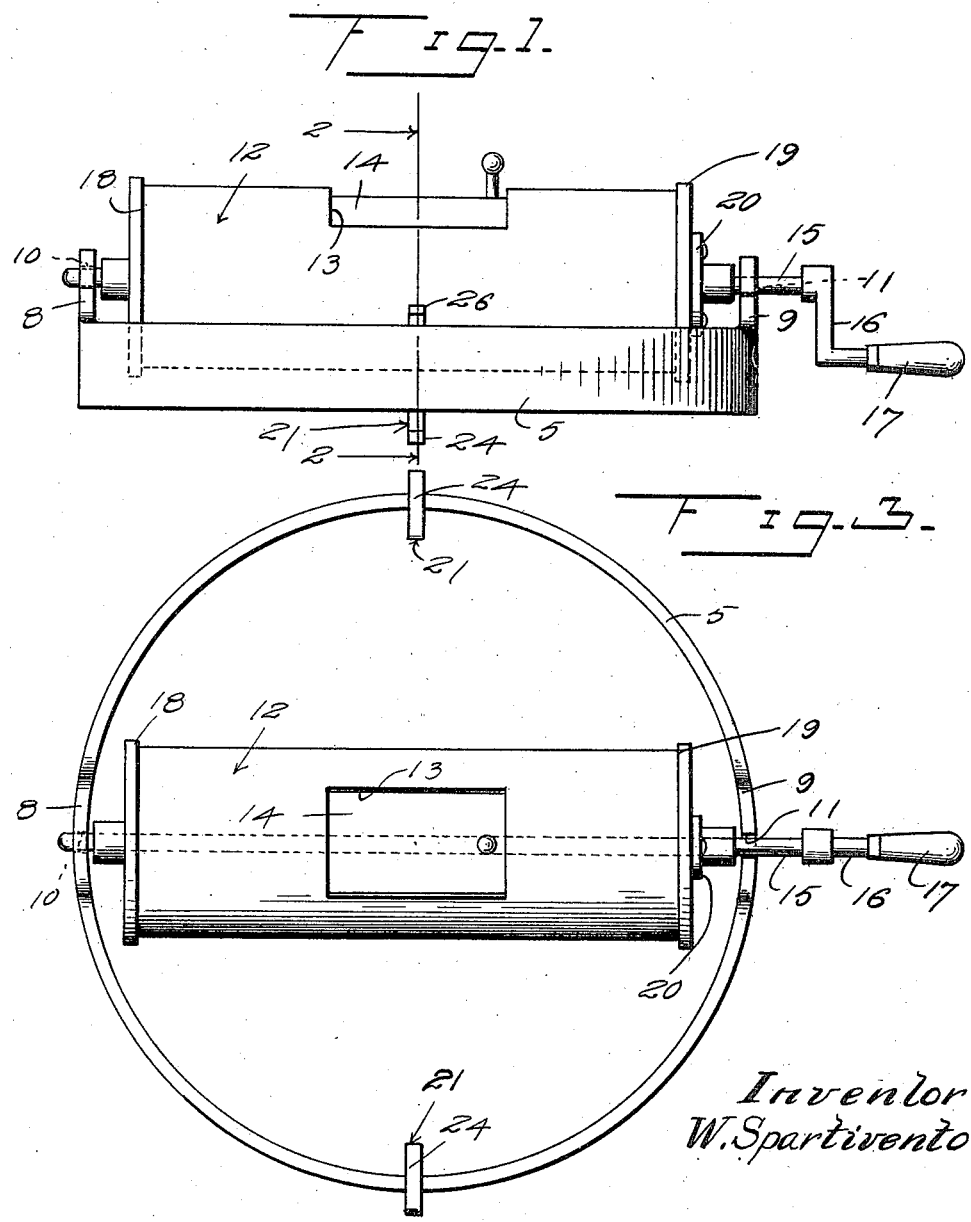
Figure 2:
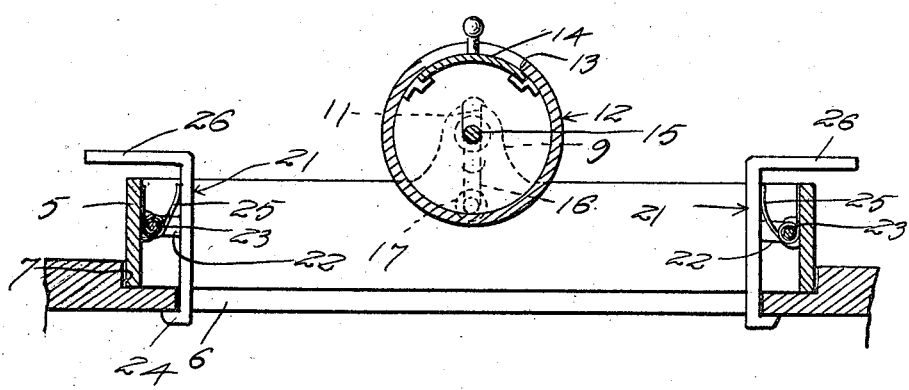
Figure 4:
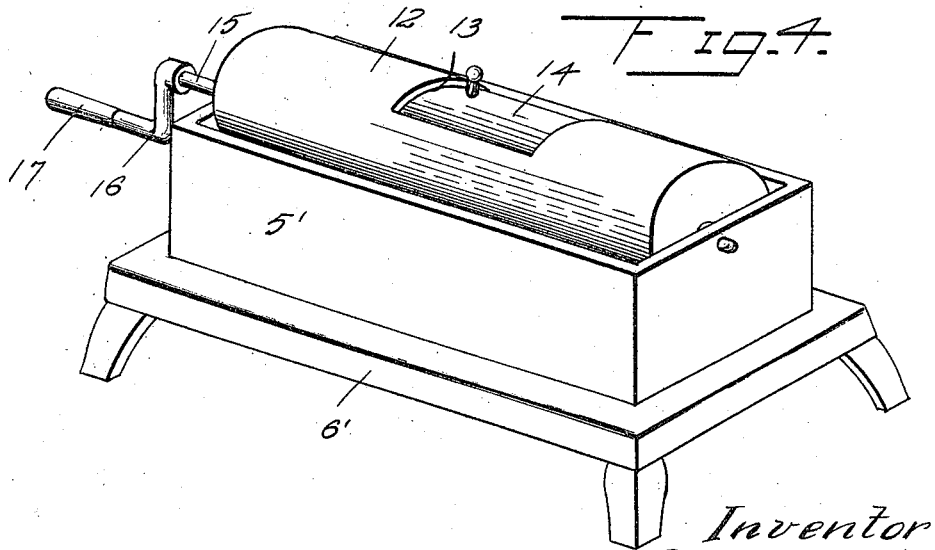

In the accompanying drawings forming a part of this specification, and in which like numerals are employed to designate like parts throughout the same, Figure 1 is a side elevation of a device embodying my invention, Figure 2 is a transverse section taken on line 2—2 of Figure 1, Figure 3 is a plan view of the same, and, Figure 4 is a perspective view of a slightly different form of device embodying my invention.

In the drawings, wherein for the purpose of illustration is shown a preferred embodiment of my invention, the numeral 5 designates a supporting member, preferably annular, and adapted to fit within the rim 6 surrounding the hole in a stove, using any suitable fuel, and having an upstanding annular flange 7. The supporting member is provided at oppositely arranged points with upstanding ears 8 and 9. The ear 8 has an aperture 10, while the ear 9 has a vertical notch 11.

The numeral 12 designates a preferably cylindrical container or receptacle, for holding the coffee to be roasted, the same having upon one side thereof an opening 13, adapted to be covered by a sliding door 14.

The numeral 15 designates a rotatable supporting shaft, one end of which is adapted for insertion within the opening 10, while its oposite end may be inserted within the vertical notch 11. The shaft 15 carries a crank 16, having a handle 17, by means of which it may be turned.

The shaft 15 extends through the ends 18 and 19 of the receptacle 12, and a head 20 is rigidly secured upon the shaft 15, and also upon the end 19.

Means are provided to lock the supporting member 5 within the flange 7, comprising diametrically oppositely arranged latch levers 21, arranged inwardly of such number, and having cranks 22, rigidly secured thereto. These cranks have their outer ends pivoted to the member 5, as shown at 23. The lower ends of the latch levers 21 have lateral extensions 24, to engage beneath the frame 6, and are swung outwardly therebeneath, by springs 25. Horizontal extensions 26 are secured to the upper ends of the latch levers, and extend over and beyond the member 5.

In Figure 4 the receptacle 12 is shown as pivotally supported within a member 5', similar to the member 5, but rectangular. This member is arranged upon or carried by a one-burner stove 6'.

In the use of the first form of the device it is obvious that by depressing the extensions 26, the extensions 24 may be moved inwardly to clear the rim 6, to permit the supporting member 5 being arranged upon or removed from the ring 6. When the extensions 26 are released, the springs 25 throw the extensions 24 outwardly, to engage beneath the rim 6.

It is to be understood that the forms of my invention herewith shown and described are to be taken as preferred examples of the same, and that various changes in the shape, size, and arrangement of parts may be resorted to without departing from the spirit of my invention, or the scope of the subjoined claim.

Having thus described my invention, I claim:

A roasting apparatus including an endless frame for snug disposition in a lid opening of a stove in place of the lid and on the supporting means for the lid, said frame essentially consisting of an upstanding wall and open at top and bottom, means on the frame to coact with the last mentioned means to secure the frame against vertical displacement having handle portions extending outwardly beyond the frame, the frame being adapted to extend a distance above the top of the stove, a container for the material to be roasted surrounded by said frame, a supporting shaft for said container, and ears integral with and rising in line with and from the frame removably journaling said shaft.

In testimony whereof I affix my signature in presence of two witnesses.

WILLIAM SPARTIVENTO.

Witnesses:
ALFREDO TETI,
ANTONIO CELLI.